United States Patent
Hertweck (10) Patent No.: US 9,164,877 B2
(45) Date of Patent: Oct. 20, 2015

(54) BUSINESS APPLICATION INSPECTION AND MODIFICATION

(71) Applicant: Jens Hertweck, Bad Schoenborn (DE)

(72) Inventor: Jens Hertweck, Bad Schoenborn (DE)

(73) Assignee: SAP SE, Walldorf (DE)

( * ) Notice: Subject to any disclaimer, the term of this patent is extended or adjusted under 35 U.S.C. 154(b) by 35 days.

(21) Appl. No.: 13/924,318

(22) Filed: Jun. 21, 2013

(65) Prior Publication Data

US 2014/0380272 A1    Dec. 25, 2014

(51) Int. Cl.
*G06F 9/44* (2006.01)
*G06F 11/36* (2006.01)

(52) U.S. Cl.
CPC .............. *G06F 11/3664* (2013.01); *G06F 8/34* (2013.01)

(58) Field of Classification Search
None
See application file for complete search history.

(56) References Cited

U.S. PATENT DOCUMENTS

| | | | |
|---|---|---|---|
| 5,535,406 A * | 7/1996 | Kolchinsky | 712/10 |
| 5,675,803 A * | 10/1997 | Preisler et al. | 717/131 |
| 6,275,223 B1 | 8/2001 | Hughes et al. | |
| 6,601,233 B1 * | 7/2003 | Underwood | 717/102 |
| 7,010,698 B2 | 3/2006 | Sheymov | |
| 7,386,831 B2 | 6/2008 | Flanagan | |
| 7,925,659 B2 | 4/2011 | Wefers et al. | |
| 8,001,530 B2 | 8/2011 | Shitrit | |
| 8,291,374 B2 | 10/2012 | Cullum et al. | |
| 8,341,593 B2 | 12/2012 | Fildebrandt et al. | |
| 2005/0154742 A1 * | 7/2005 | Roth et al. | 707/100 |
| 2005/0257157 A1 * | 11/2005 | Gilboa et al. | 715/747 |
| 2006/0036745 A1 * | 2/2006 | Stienhans et al. | 709/228 |
| 2007/0157163 A1 * | 7/2007 | Nissen et al. | 717/106 |
| 2008/0209392 A1 * | 8/2008 | Able et al. | 717/105 |
| 2008/0250325 A1 | 10/2008 | Feigenbaum et al. | |
| 2010/0023928 A1 | 1/2010 | Hentschel et al. | |
| 2010/0138734 A1 * | 6/2010 | Braud et al. | 715/227 |
| 2010/0281458 A1 | 11/2010 | Paladino et al. | |
| 2011/0209135 A1 | 8/2011 | Sakuma | |
| 2011/0246968 A1 | 10/2011 | Zhang et al. | |
| 2012/0167060 A1 | 6/2012 | Landwehr et al. | |
| 2012/0210296 A1 * | 8/2012 | Boulter et al. | 717/107 |
| 2013/0041925 A1 | 2/2013 | Balko | |
| 2014/0045597 A1 | 2/2014 | Fernandez et al. | |
| 2014/0245255 A1 * | 8/2014 | Karlsen | 717/106 |
| 2014/0245269 A1 * | 8/2014 | Thukkaram et al. | 717/129 |
| 2014/0281886 A1 * | 9/2014 | Hirsch et al. | 715/234 |
| 2014/0282398 A1 * | 9/2014 | Podolyak et al. | 717/121 |

* cited by examiner

*Primary Examiner* — Don Wong
*Assistant Examiner* — Daxin Wu
(74) *Attorney, Agent, or Firm* — Mintz Levin Cohn Ferris Glovsky and Popeo, P.C.

(57) ABSTRACT

An inspection and modification window can be displayed within a user interface of a business application being executed in a business application inspection and modification environment. Application code relating to a current navigation point within the business application can be listed within the inspection and modification window. Modifications to the Application code can be received via one or more user inputs, and the business application can be executed from the current navigation point to test how the received modifications to the application code affect operation of the business application.

20 Claims, 7 Drawing Sheets

BUSINESS APPLICATION INSPECTION AND MODIFICATION

TECHNICAL FIELD

The subject matter described herein relates generally to development tools for software applications, and in some examples to development tools for business software applications.

BACKGROUND

A business software application (BSA, also referred to in this disclosure as a business application) generally includes software or a set of computer programs usable by business users to perform various business functions to perform operations relating to increasing productivity, measuring productivity, improving the accuracy of business function performance, and the like. In some examples, one or more business software applications can be included as part of an enterprise resource planning (ERP) framework, a customer relationship management (CRM) framework, a sales automation framework, or other business software framework.

Development of a business software application can typically occur via an iterative process. For example, the process can typically include writing of code, compiling the newly written code (optionally in conjunction with previously written code), deploying the code, and running the business software application. To test a feature added by the newly written code, it is typically necessary for a development team member (e.g. the developer himself or herself or a software tester) to execute some number of navigation steps within the running business software application to reach a part of the task flow or other operation of the business application at which the feature can be tested. If testing of the newly added feature in this manner indicates that further changes are required, currently available approaches generally require repetition of the writing, compiling, and deploying of another iteration of newly written code followed by repetition of the execution of the navigations steps to reach the part of the task flow or other operation of the business application at which the feature can be tested again. Such an approach can be time consuming, costly, inefficient, etc. for a development team.

In addition to software products produced by development teams for shipment, sale, etc. to end user customers, increasing numbers of business software applications include scripting capabilities that allow key users, script programmers, etc. at a business application customer organization to create customized functionality. For example, software packages exist that allow customers of a business software framework (e.g., an ERP framework, a CRM framework, a sales automation framework, etc.) to build customized applications, such as for example business intelligence web applications and the like. Scripting of such applications can also include a potentially frustrating cycle of coding, compiling, deploying, and testing.

SUMMARY

One or more implementations of the current subject matter can include improved approaches to development of features in software applications, such as for example web applications based on scripting languages. Among other potential advantages, In one aspect, a method includes displaying an inspection and modification window within a user interface of a business application being executed in a business application inspection and modification environment, and listing application code relating to a current navigation point within the business application within the inspection and modification window. The method further includes receiving modifications to the application code via one or more user inputs, and executing the business application from the current navigation point to test how the received modifications to the application code affect operation of the business application.

In some variations one or more of the following can optionally be included. For example, the displaying of the inspection and modification window can occurs in response to at least one of detection of a first user input from a user of the business application inspection and modification environment and starting of the business application by a user with an additional URL parameter that calls the business application inspection and modification environment. The business application can be executed in the business application inspection and modification environment with full access to all objects needed by the business application for productive use of the business application by an end user. The modifications to the application code can include at least one change to a property of an object within the business application, an insertion of a code snippet or segment for testing at the current navigation point, or the like. The modifications to the application code can also or alternatively include pasting a template or other previously created code segment into the application code at a location where normal productive use of the business application would activate that location in the application code. The executing of the business application from the current navigation point need not require a restart of the business application for the test.

Implementations of the current subject matter can include, but are not limited to, systems and methods including one or more features described herein as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Modern integrated development environments (IDEs), such as for example the Eclipse IDE (available from Eclipse Foundation of Ottawa, Canada), can offer a way to inspect code and to evaluate certain scripted expressions (e.g. expressions scripted in Java™ or another platform-independent scripting language). In general, relevant aspects of Java™ objects or objects of other platform-independent scripting language cannot be easily changed via an IDE. Additionally, the level of abstraction can typically differ from that to which a business application developer is accustomed. These objects are typically available in the debugger and do not necessarily directly represent business objects or other data structures within which business data of an organization are retained, processed, manipulated, entered, or the like.

Another possible approach is to debug the server application code, which may allow access to business data. However, use of such an approach can typically require starting the entire server in debug mode, which can be highly impractical, particularly for end-user scripting development. In still other approaches, a browser (e.g. Internet Explorer™ available from Microsoft Corp. of Redmond, Wash., Chrome™ available from Google, Inc. of Mountain View, Calif., etc.) can generally allow execution of arbitrary script (e.g. JavaScript™, ECMAScript, or the like) code. However, the testing of scripting that is generally possible using such approaches is generally limited user interface objects and not to objects on a level of a business application. As such, while in-browser testing of scripting code can in some cases be useful for testing a "look and feel" of a business application, it is generally not possible to execute important aspects of the functionality of the business application, such as for example how the business application accesses and interacts with data objects (e.g. business objects, etc.) in one or more repositories of a business software framework.

In addition to the potential weaknesses or disadvantages of currently available approaches discussed above, such approaches can also include the further challenge of requiring that a user operate a highly technical editing and testing environment that is typically not geared for a business application developer. Additionally, existing approaches generally do not provide the ability to quickly and conveniently executer arbitrary code fragments at a specific navigation point within a business application. For example, a developer, business application scripter, or the like may wish to experiment with differing functionality, differing coding for implementing an existing set of functions, or the like that are relevant to a specific use context or navigation point within the business application and that are supported by one or more snippets, section, etc. of code. Using existing tools, the developer or scripter would generally be required to insert these snippets, section, etc. of code into the application code, complete the steps of compiling, deploying, etc. of the business application, and then navigate to the specific use context or navigation point within the business application. This can be especially tiresome in even relatively simple business applications. In a highly complicated business application, these kinds of repetitive tasks can reduce development efficiency, potentially lead to errors, and generally increase the development cost.

To address one or more of the aforementioned challenges or other issues with currently available solutions, implementations of the current subject matter can include features of business application development approaches in which an editing environment is provided on a same level (e.g. at a business application language level) as an editor for writing the business application code. In this manner, the editing environment can employ similar terms and objects as those already known to the business application developer.

Figure 1:
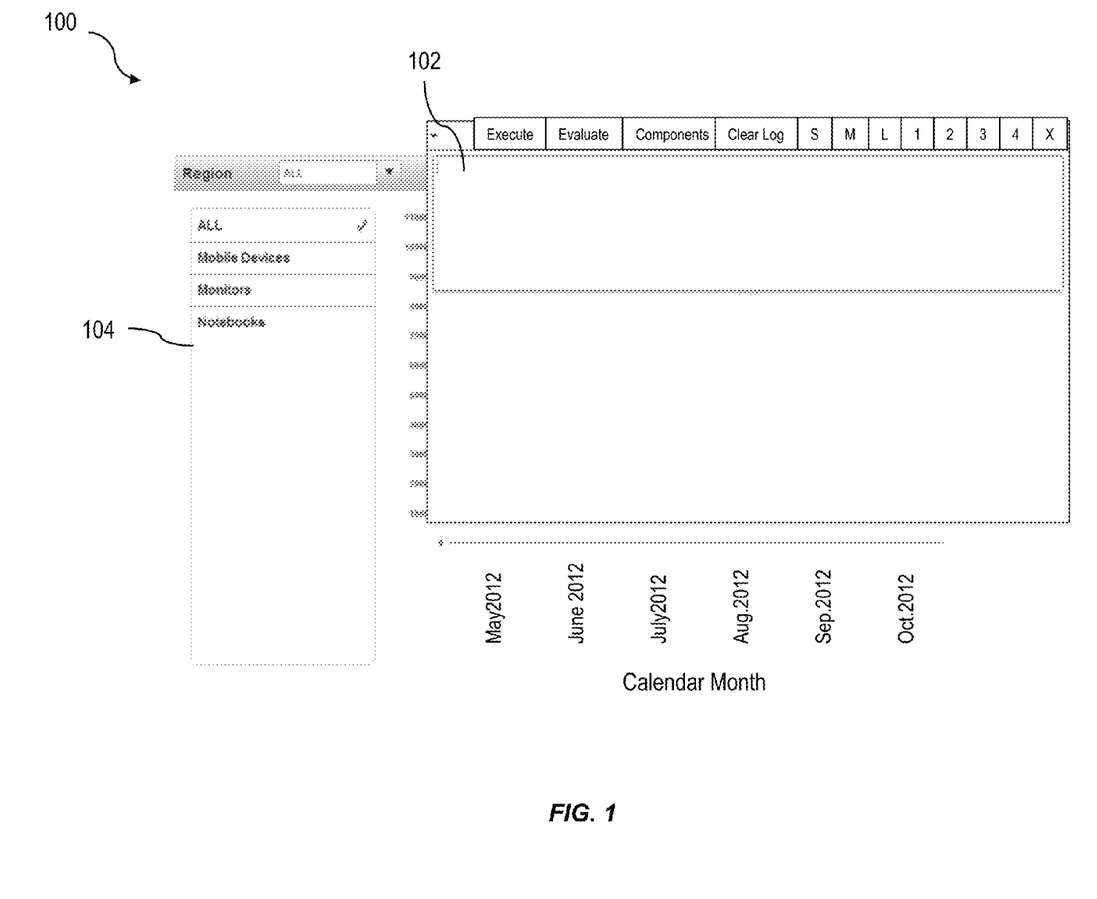
FIG. 1 shows a screenshot view illustrating features of a business application inspection and modification environment consistent with implementations of the current subject matter.
Figure 2A:
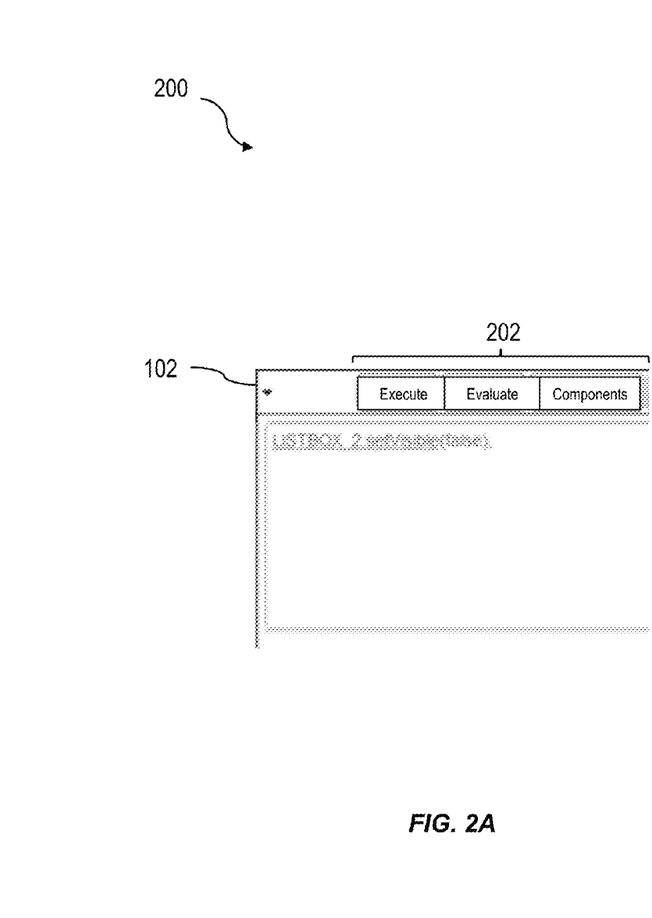
FIG. 2A and FIG. 2B show screenshot views illustrating features of an inspection and modification window of a business application inspection and modification environment consistent with implementations of the current subject matter.
Figure 2B:
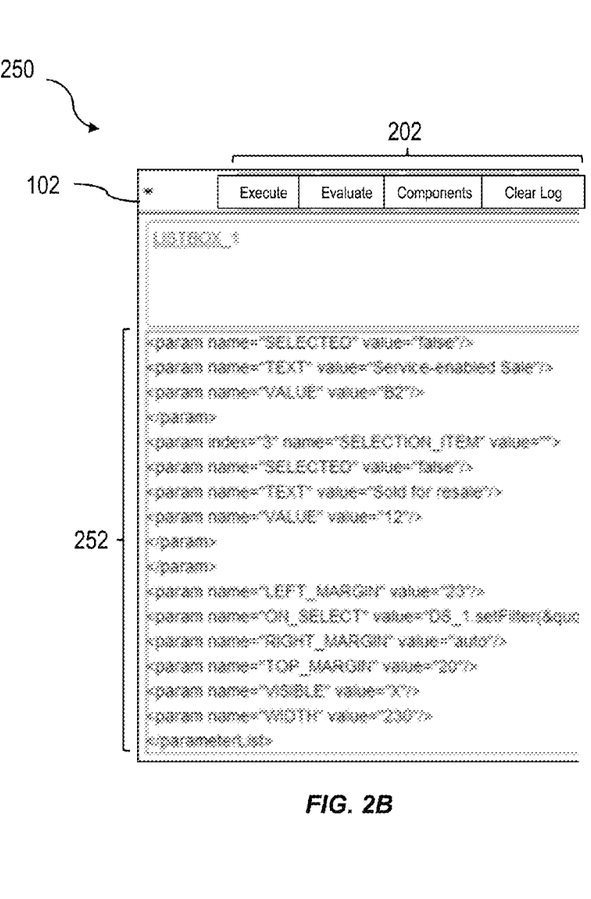
Figure 3:
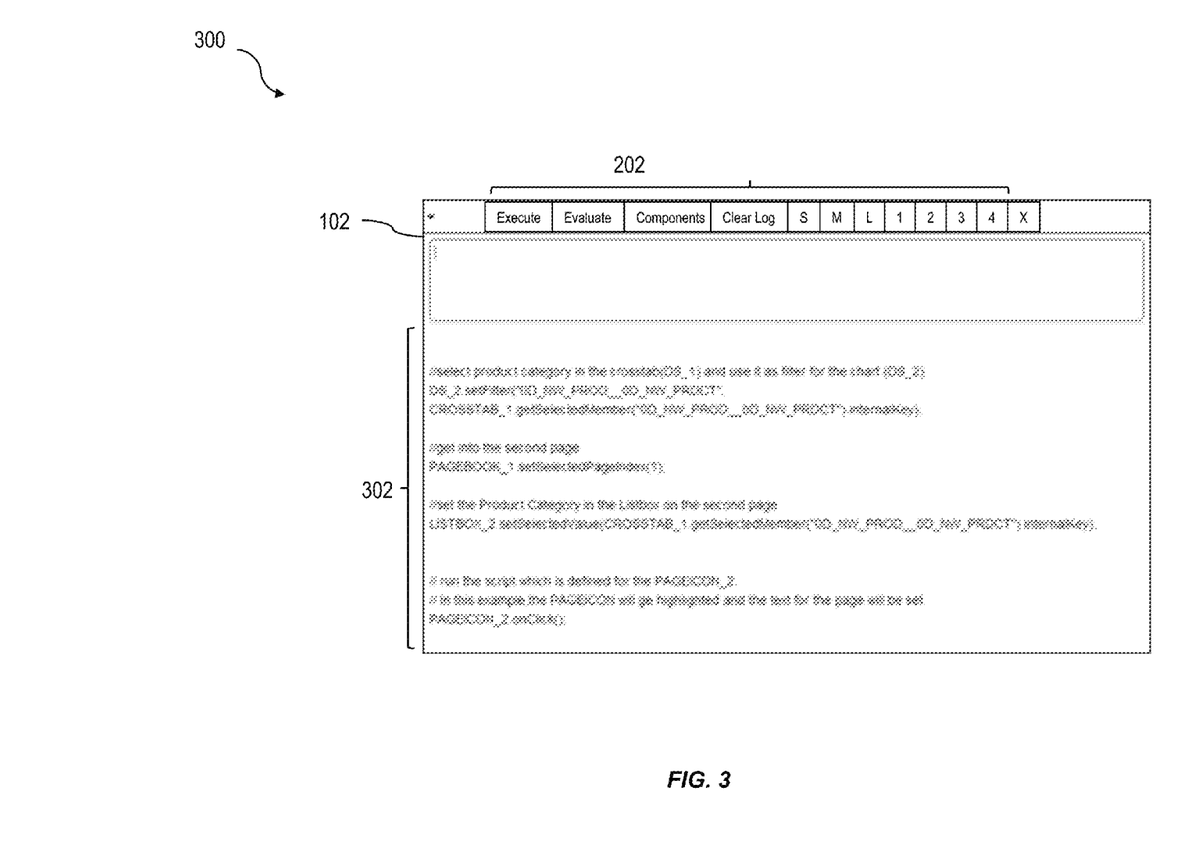
FIG. 3 shows a screenshot view illustrating additional features of an inspection and modification window of a business application inspection and modification environment consistent with implementations of the current subject matter.

FIG. 1 through FIG. 3 show a series of screenshot views 100, 200, 250, 300 that show examples of features that can be included in a business application inspection and modification environment consistent with implementations of the current subject matter.

The screenshot view 100 of FIG. 1 shows a business application inspection and modification environment, which can optionally be implemented as an inspection and modification window 102 displayed within a user interface screen 104 of a business application. The term "displayed within" is intended to broadly refer to concurrently displaying the inspection and modification window 102 in association with the user interface screen 104. For example, the inspection and modification window 102 can be shown as a pane or window or frame, etc. of a segmented display, such that another pane or window or frame, etc. of segmented display includes other aspects of the user interface. In the example of FIG. 1, the inspection and modification window 102 is a floating window that is displayed overlaid on the other elements of the user interface. In general, unless otherwise expressly or inherently incompatible with the descriptions herein, the inspection and modification window 102 is "displayed within" a user interface of the business application such that modifications of, additions to, deletions from, etc. the code underlying the business application can be performed in the inspection and modification window 102, which can be accessed directly and concurrently with a business application user interface while the business application is executed using functionality of a business application inspection and modification environment consistent with implementations of the current subject matter.

The inspection and modification window 102 can be displayed when a business application is started in an inspection and modification mode to make use of functionality of the business application inspection and modification environment. A business application inspection and modification environment consistent with the subject matter described herein can permit the business application to be executed and navigated just as it would under typical end user operating conditions. In other words, the business application inspection and modification environment allows execution of the business application as though the business application were being executed as part of productive use by an end user.

A user can execute new application code at any point in time with the help of the business application inspection and modification environment within the context of the running business application, for example as illustrated in the screenshot view 200 of FIG. 2A. One or more user interface elements 202, such as for example "clickable" buttons as shown in FIG. 2A, can allow a user of the inspection and modification environment to select desired actions, etc. Additional application code entered into the inspection and modification window 102 can be capable of accessing any object of the business application and changing, reading, etc. any available properties 252 of the object, for example as shown in the screenshot view 250 of FIG. 2B. The objects discussed here can include data objects, business object, and other data structures that are either created by the business application or accessed and interacted with by the business application. With the inspection and modification environment in place, the business application does not need to be restarted to test or try changes at the point affected by the adjustment to the code.

A business application inspection and modification environment consistent with implementations of the current subject matter can also be capable of displaying application code 302 as it is executed during use or testing of the business application, for example as shown in the screenshot view 300 of FIG. 3. New application code can be executed on demand from a user, developer, coder, etc. with the help of the inspection and modification environment in the context of the running business application. The additional application code can access any object of the application and change or read all properties available. Additionally, a user can, using the inspection and modification window 102, insert one or more snippets or segments of code that can be tested within a current context of the business application as it is being executed in the business application inspection and modification environment. These inserted snippets or segments of code can be arbitrary in the sense that the developer or business application scripter can experiment with any desired additional, modified, improved, etc. functionality or coding approaches to providing existing functionality.

The ability to display the application code 302 as it is executed can allow a user of the business application inspection and modification environment to use the application as if he or she were a typical business user in the course of normal productive business operations. Receipt of a user input, such as for example selection of a button, other user interface element, etc.; entering of one or more keystrokes; a voice command, of the like executed by the user of the business application inspection and modification environment can cause the executed application code 302 to be displayed in the inspection and modification window 102. In this manner, a template or other previously created code segment can be pasted into the displayed code 302 in the inspection and modification window 102 at the exact location where normal productive use of the business application would activate that part of the application code. Receipt of another user input (e.g. one executed by the user of the business application inspection and modification environment) can cause resumption of operation of the business application such that the application code 302 that is changed, added to, deleted, or otherwise modified via the inspection and modification window 102 can be tested immediately without requiring compilation of the changed code, deployment of the modified business application, execution of the deployed business application, and navigation within the business application to a point at which the modified code has an effect.

In at least some implementations of the current subject matter, the business application source code is not changed through use of the business application inspection and modification environment consistent with the descriptions above. Rather, the business application inspection and modification environment can allow testing of modifications to the application code 302. Based on the results of one or more tests performed using the business application inspection and modification environment (e.g. using application code 302 executed through the environment to test its effects at various points in operation of the business application under simulated productive business usage), the application source can be changed to reflect favorable testing outcomes. As an example, the testing of arbitrary code snippets or segments as discussed above can allow a developer or business applicator scripter to efficiently converge to a preferred version of the code using the business application inspection and modification environment. These tested code snippets or segments can then be inserted into the source code of the business application.

Figure 4:
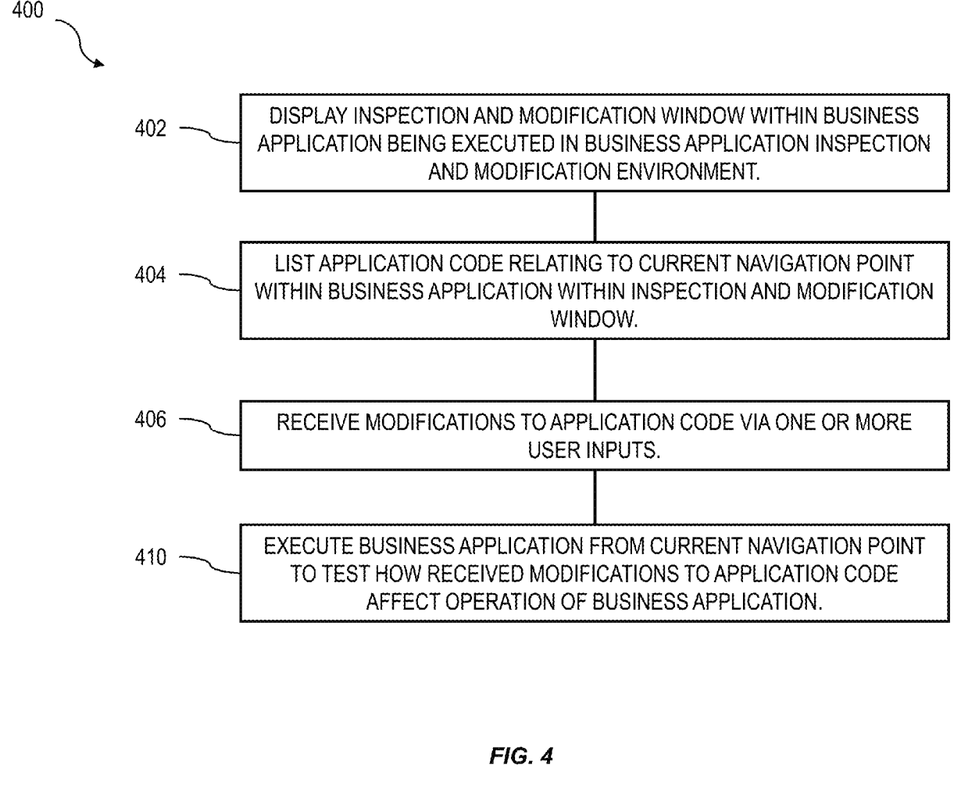
FIG. 4 shows a process flow diagram illustrating aspects of a method having one or more features consistent with implementations of the current subject matter.

FIG. 4 shows a process flow chart 400 illustrating a method. One or more features of such a method can occur in various implementations of the current subject matter. At 402, an inspection and modification window is displayed within a business application being executed in a business application inspection and modification environment, for example within a user interface of the business application. As discussed above, the displaying of the inspection and modification window can occur in response to detection of a first user input from a user of the business application inspection and modification environment. Alternatively or in addition, a user can start the business application with an additional URL parameter, which causes the inspection and modification window to be displayed. At 404, application code relating to a current navigation point within the business application is listed within the inspection and modification window.

Modifications to the application code are received via one or more user inputs at 406, and at 410 the business application is executed from the current navigation point to test how the received modifications to the application code affect operation of the business application. The executing of the business application advantageously occurs within the business application inspection and modification environment without a need to exit the business application inspection and modification environment and re-launch the business application. The modifications to the application code can include at least one change to a property of an object within the business application. Alternatively or in addition, the modifications to the application code can include pasting a template or other previously created code segment into the application code at a location where normal productive use of the business application would activate that location in the application code.

The business application can be executed in the business application inspection and modification environment with full access to all objects needed by the business application for productive use of the business application by an end user. Also, as noted above, the executing of the business application from the current navigation point does not require a restart of the business application for the test.

Figure 5:
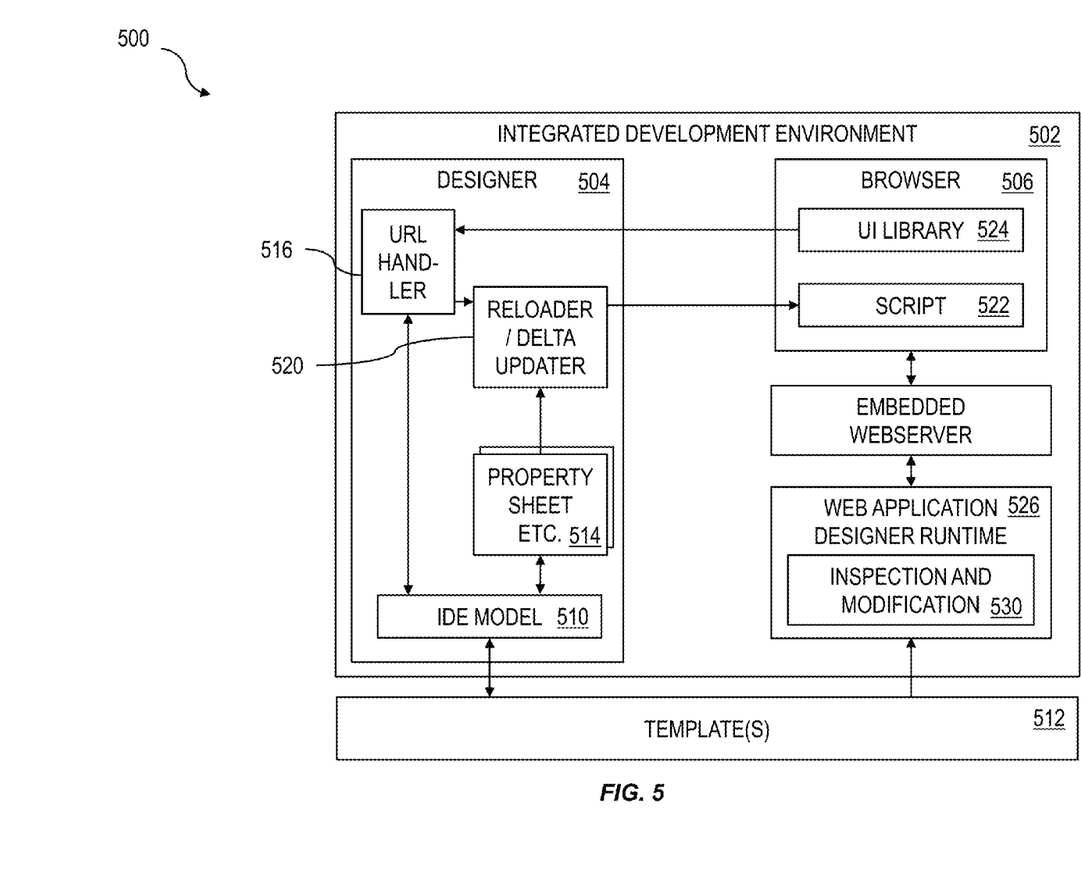
FIG. 5, FIG. 6, and FIG. 7 show diagrams illustrating aspects of system, architectures, frameworks, and the like capable of implementing features and functionality discussed herein.

FIG. 5 shows a diagram 500 illustrating aspects of an integrated development environment architecture 502. In some implementations of the current subject matter, a business application being operated upon by a business application inspection and modification environment can be previewed in a browser hosted by an IDE during the development process. In other implementations of the current subject matter, a business application inspection and modification environment can be independent of an IDE and can also run at runtime, for example when the business application is deployed to a server. While support form an IDE can be useful in some implementations, no specific support of this nature is necessary for operation of a business application inspection and modification environment consistent with the descriptions provided herein and the subject matter of this application in general.

Continuing with reference to FIG. 5, the integrated development environment architecture 502 can include a designer module 504 as well as a browser module 506. Within the designer module, an integrated development environment model 510 can access, make use of, modify, etc. templates 512, such as for example user interface templates, which can be retained in a template store. One or more property sheets 514, which can retain configuration settings of a particular resource (e.g. user interface elements, etc.), and a uniform resource locator (URL) handler 516 can access and write to the IDE model 510. The designer module 504 can interact with the browser module 506, for example via a reloader/delta updater module 520, which can communicate changes to a business application made via the designer module 504 for display in the browser module. This functionality can provide a "what you see is what you get" (WYSIWYG) capability to allow a user to visualize the changes made via the designer module as they will be experienced by end users of a business application. The browser module 506 can include support for scripting languages 522 (e.g. JavaScript™, ECMAScript, or the like) and a user interface library 524.

A web application designer runtime module 526 can also access the template or templates. The web application designer runtime module 526 can implement business application inspection and modification functionality 530 consistent with one or more features described herein with regard to the business application inspection and modification environment. The modules and other functionality shown in FIG. 5 and discussed above will be understood by one of ordinary skill in the art to be implementable on one or more computing systems that can include, without limitation, all or some of the following: one or more programmable processors, one or more data storage devices or other computer readable media, networking connections, display devices, user input devices, and the like.

Figure 6:
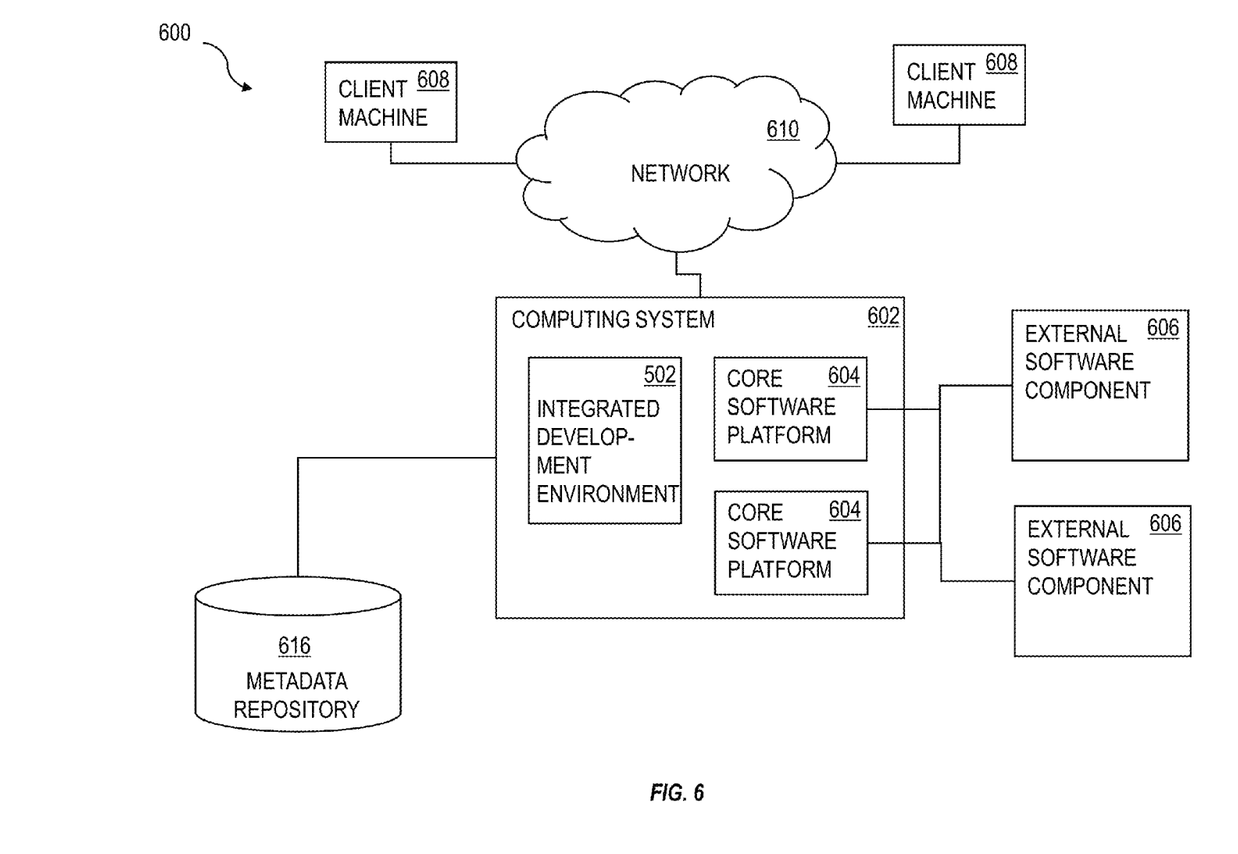
Figure 7:
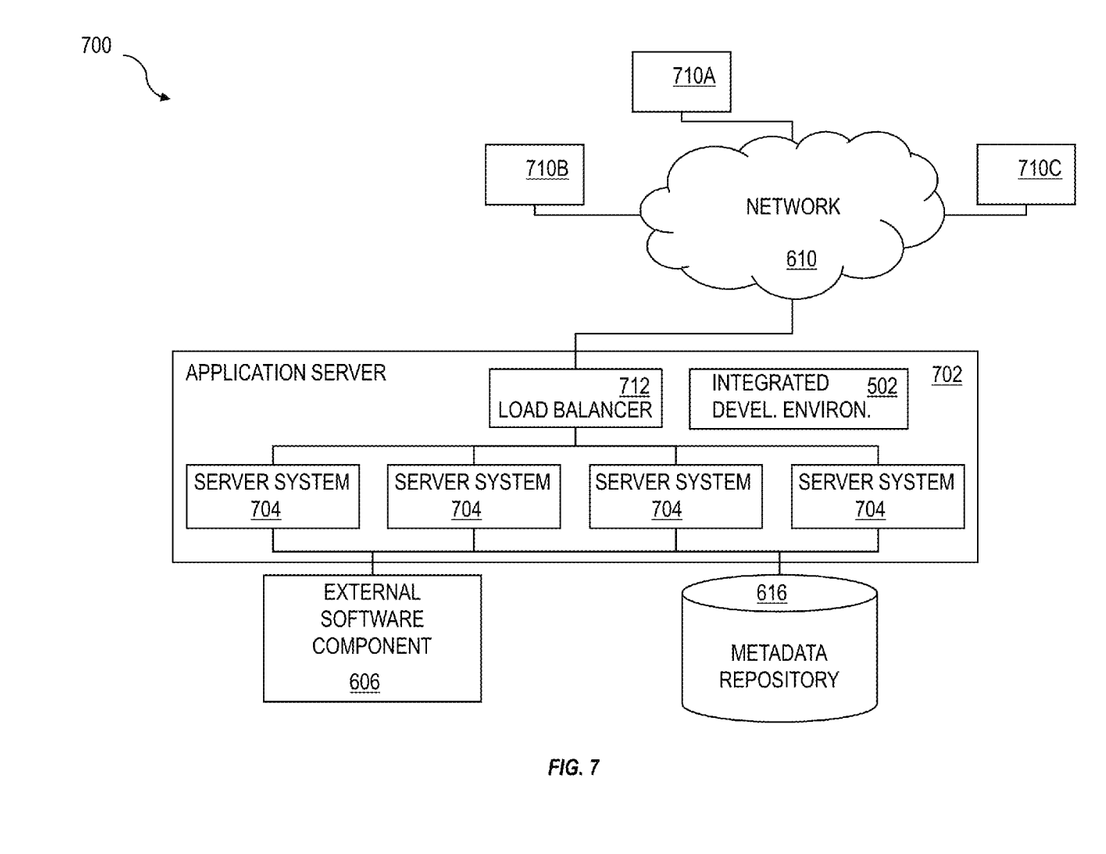

Business applications consistent with those referenced herein can in some example be used within a larger business software framework or other business software architecture, etc. FIG. 6 and FIG. 7 show diagrams 600, 700 of systems consistent with such an implementation. As shown in FIG. 6, a computing system 602 can include one or more core software platform modules 604 providing one or more features of the business software system. The computing system can also aggregate or otherwise provide a gateway via which users can access functionality provided by one or more external service providers 606. Client machines 608 can access the computing system, either via a direct connection, a local terminal, or over a network 610 (e.g. a local area network, a wide area network, a wireless network, the Internet, or the like). An integrated development environment 502 can be hosted on the computing system 602 or alternatively, on an external system accessible over a network connection. The integrated development environment 502 can optionally include one or more discrete software and/or hardware modules that perform operations such as those described herein.

The computing system 602 and also the integrated development environment 502 can access one or more metadata repositories and/or other data repositories 616 (e.g. process repositories, scenarios repositories, transactional data repositories, etc.) that can store definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. In some examples, the definition can optionally be stored as a business object. In some implementations, the business object can include a template definition of a standard business process. The template definition that can optionally be modified via one or more extensions that are stored in the one or more metadata repositories 616.

FIG. 7 shows a block diagram 700 of a multi-tenant implementation of a software delivery architecture that includes an application server 702, which can in some implementations include multiple server systems 704 that are accessible over a network 610 from client machines operated by users at each of multiple organizations 710A-710C (referred to herein as "tenants" of a multi-tenant system) supported by a single software delivery architecture 700. For a system in which the application server 702 includes multiple server systems 704, the application server 702 can include a load balancer 712 to distribute requests and actions from users at the one or more organizations 710A-710C to the one or more server systems 704. Instances of the core software platform 604 (not shown in FIG. 7) can be executed in a distributed manner across the server systems 704. A user can access the software delivery architecture across the network using a thin client, such as for example a web browser or the like, or other portal software running on a client machine. The application server 702 can access data and data objects stored in one or more data repositories 616. The application server 702 can also serve as a middleware component via which access is provided to one or more external software components 606 that can be provided by third party developers.

As in the example illustrated in FIG. 6, the metadata repository 616 can store a business object that represents a template definition of a standard business process. Each individual tenant 710A-710C can customize that standard template according to the individual business process features specific to business of the organization to which that tenant is assigned. Customizations can be stored as extensions in the metadata repository 616.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable storage medium storing instructions that, when executed by at least one programmable processor, cause the at least one programmable processor to perform operations comprising:
   displaying, within a business application being executed in a business application inspection and modification environment, an inspection and modification window;
   listing, within the inspection and modification window, application code relating to a current navigation point within the business application, wherein the application code includes one or more script languages;
   receiving, via one or more user inputs, modifications to the application code, the modifications comprising an insertion of a code snippet or segment for testing at the current navigation point;
   and resuming execution of the business application from the current navigation point to test how the received modifications to the application code affect operation of the business application.

2. The computer program product as in claim 1, wherein the displaying of the inspection and modification window occurs in response to at least one of detection of a first user input from a user of the business application inspection and modification environment and starting of the business application by a user with an additional URL parameter that calls the business application inspection and modification environment.

3. The computer program product as in claim 1, wherein the business application is executed in the business application inspection and modification environment with full access to all objects needed by the business application for productive use of the business application by an end user.

4. The computer program product as in claim 1, wherein the modifications to the application code further comprise a change to a property of an object within the business application.

5. The computer program product as in claim 1, wherein the modifications to the application code comprise pasting a template or other previously created code segment into the application code at a location where normal productive use of the business application would activate that location in the application code.

6. The computer program product as in claim 1, wherein the resuming execution the business application from the current navigation point does not require a restart of the business application for the test.

7. A system comprising:
   computer hardware to perform operations comprising:
   displaying, within a business application being executed in a business application inspection and modification environment, an inspection and modification window;
   listing, within the inspection and modification window, application code relating to a current navigation point within the business application, wherein the application code includes one or more script languages;
   receiving, via one or more user inputs, modifications to the application code, the modifications comprising an insertion of a code snippet or segment for testing at the current navigation point; and resuming execution of the business application from the current navigation point to test how the received modifications to the application code affect operation of the business application.

8. The system as in claim 7, wherein the displaying of the inspection and modification window occurs in response to at least one of detection of a first user input from a user of the business application inspection and modification environment and starting of the business application by a user with an additional URL parameter that calls the business application inspection and modification environment.

9. The system as in claim 7, wherein the business application is executed in the business application inspection and modification environment with full access to all objects needed by the business application for productive use of the business application by an end user.

10. The system as in claim 7, wherein the modifications to the application code further comprise a change to a property of an object within the business application.

11. The system as in claim 7, wherein the modifications to the application code comprise pasting a template or other previously created code segment into the application code at a location where normal productive use of the business application would activate that location in the application code.

12. The system as in claim 7, wherein the resuming execution of the business application from the current navigation point does not require a restart of the business application for the test.

13. A computer-implemented method comprising:
displaying, within a business application being executed in a business application inspection and modification environment, an inspection and modification window;
listing, within the inspection and modification window, application code relating to a current navigation point within the business application, wherein the application code includes one or more script languages;
receiving, via one or more user inputs, modifications to the application code, the modifications comprising an insertion of a code snippet or segment for testing at the current navigation point; and resuming execution of the business application from the current navigation point to test how the received modifications to the application code affect operation of the business application.

14. The computer-implemented method as in claim 13, wherein the displaying of the inspection and modification window occurs in response to at least one of detection of a first user input from a user of the business application inspection and modification environment and starting of the business application by a user with an additional URL parameter that calls the business application inspection and modification environment.

15. The computer-implemented method as in claim 13, wherein the business application is executed in the business application inspection and modification environment with full access to all objects needed by the business application for productive use of the business application by an end user.

16. The computer-implemented method as in claim 13, wherein the modifications to the application code further comprise a change to a property of an object within the business application.

17. The computer-implemented method as in claim 13, wherein the modifications to the application code comprise pasting a template or other previously created code segment into the application code at a location where normal productive use of the business application would activate that location in the application code.

18. The computer-implemented method as in claim 13, wherein the resuming execution of the business application from the current navigation point does not require a restart of the business application for the test.

19. The computer-implemented method as in claim 13, wherein at least one of the displaying, the listing, the receiving, and the executing is performed by at least one system comprising at least one programmable processor.

20. The system as in claim 7, wherein the computer hardware comprises at least one programmable processor; and a machine-readable medium storing instructions that, when executed by the at least one programmable processor, cause the at least one programmable processor to perform operations.

* * * * *